United States Patent [19]
Andersson

[11] Patent Number: 6,012,293
[45] Date of Patent: Jan. 11, 2000

[54] FREEZING OF MATERIAL INTO BLOCKS

[75] Inventor: Bo Andersson, Oxie, Sweden

[73] Assignee: Nestec S.A., Vevey, Switzerland

[21] Appl. No.: 09/091,689

[22] PCT Filed: Dec. 11, 1996

[86] PCT No.: PCT/EP96/05735

§ 371 Date: Jun. 18, 1998

§ 102(e) Date: Jun. 18, 1998

[87] PCT Pub. No.: WO97/23141

PCT Pub. Date: Jul. 3, 1997

[30] Foreign Application Priority Data

Dec. 21, 1995 [EP] European Pat. Off. .............. 95120342

[51] Int. Cl.[7] .................................................. F25C 1/10
[52] U.S. Cl. ................................................ 62/72; 62/345
[58] Field of Search ........................................ 62/72, 345

[56] References Cited

U.S. PATENT DOCUMENTS

| | | | |
|---|---|---|---|
| 1,576,019 | 3/1926 | Zimetbaum . | |
| 1,742,194 | 1/1930 | Bennett | 62/72 |
| 2,054,073 | 9/1936 | Field | 62/72 |
| 2,803,950 | 8/1957 | Bayston | 62/72 |
| 2,864,243 | 12/1958 | Berger | 62/72 |
| 3,253,420 | 5/1966 | De George | 62/72 |
| 3,309,892 | 3/1967 | O'Connell | 62/72 |
| 3,529,430 | 9/1970 | Bauerlein | 62/72 |
| 4,335,147 | 6/1982 | Sollich | 426/295 |

FOREIGN PATENT DOCUMENTS

| | | |
|---|---|---|
| 555 166 A1 | 2/1993 | European Pat. Off. . |
| 750 941 | 8/1933 | France . |
| 2 109 383 | 5/1972 | France . |
| 2 260 300 | 9/1975 | France . |
| 261967 | 9/1949 | Netherlands . |

*Primary Examiner*—William E. Tapolcai
*Attorney, Agent, or Firm*—Pennie & Edmonds LLP

[57] ABSTRACT

The present invention relates to a method and an apparatus for freezing of material into fully or partially frozen blocks. The apparatus includes a refrigeration panel and a sheet or belt which is passed along the refrigeration panel. The apparatus includes at least one flexible, material receiving mold having at least one open compartment, where the sheet or belt provides a base for the compartment. The compartment is conveyed along the refrigerating panel to freeze the material, and then is subject to bending and/or twisting forces release the block(s) from the compartment.

18 Claims, 1 Drawing Sheet

FREEZING OF MATERIAL INTO BLOCKS

BACKGROUND ART

The present invention relates to an apparatus and a method for freezing material, such as foodstuff, into portions by positioning the material divided into portions on a sheet and passing it over a contact freezing refrigerating panel. The present invention allows freezing of viscous material into portions of controlled shape and size. The present invention also relates to blocks frozen in accordance with the method or by means of the apparatus of the invention.

The present invention is especially suitable for freezing viscous foodstuff materials with or without solid pieces. For example, sauce, pieces of vegetables, meat, or mixtures thereof. The invention may advantageously be used for freezing portions weighting from 5 to 200 g or more.

A traditional way of freezing food material is by pouring the material into molds which are then cooled. This is a relatively slow way of freezing due to the very little if any direct contact with the cooling medium. Another disadvantage of this traditional mold is that releasing the frozen material from the mold is difficult due to the increased in size of the frozen material.

It is also known to chill and freeze food material by depositing it onto a sheet and passing the sheet over a contact freezing surface so as to provide, at least on its lower surface, a frozen crust. The contact freezer has the advantage that it provides fast freezing as a result of the contact between the material to be frozen and the cooling surface, while the thin sheet prevents the material from sticking to the cooling surface. Another way of freezing food material is by depositing it onto a steel belt and cooling it with nitrogen.

However, these known freezing methods suffer from the problem of controlling the shape and size of the material to be frozen, and are unsuitable for freezing composite or layered products. When dosing viscous material onto a sheet or belt it will evidently spread resulting in a flat pellet type end product. Furthermore, there is a risk that the separately dosed material will flow into the other doses and thus freeze into bigger lumps.

SUMMARY OF THE INVENTION

The present invention overcomes the above described difficulties and provides an apparatus and a method which give the possibility of:

Fast and efficient freezing of material into separated portions or blocks of well defined shape and size. A freezing of blocks in a well defined shape and size gives a good presentation of the final frozen product.

Continuous production of blocks of food material.

Freezing of products comprising layers of different material. Combining material into a layered or composite product of well defined geometry, for example, by stepwise filling and freezing of the material in the mold produces a well defined layered product.

Suitability for freezing of small blocks e.g. 1–10 g.

Suitability for freezing blocks of ready meals, e.g. 150–200 g or even bigger blocks comprising homogeneous mixed material or composite products.

Production of products of homogeneous weight, volume and size, products the metering of which eases the filling of final packages and minimises overfilling of the packages.

DETAILED DESCRIPTION OF THE INVENTION

In the present context "blocks" shall be taken to mean every shape which can be in a mold, e.g. cubes, thin pellets, or units of more complex geometry.

Accordingly, in a first aspect the invention provides an apparatus for freezing of material into blocks comprising cooling means and motion means to pass a sheet or belt along the cooling means, characterised in that the apparatus further comprises at least one flexible, material receiving mold comprising at least one upwards and downwards open compartment, conveying means to convey the mold, along the cooling means on top of the sheet or belt acting as a base of the compartment in at least part of the passage, and bending means to bend the mold to release the block in the compartment.

In a preferred embodiment of the invention, the cooling means is a refrigerating panel and the material to be frozen is dosed onto a sheet which is moved by the motion means. Advantageously, convection freezing means may be provided e.g., above the refrigerating panel.

In an alternative preferred embodiment of the invention the cooling means is nitrogen and a steel belt acts as a base of the compartments.

The conveying means may comprise a support or a fixation for the mold or molds, and means for conveying the support or fixation such as a conventional motor. In a preferred embodiment of the invention the conveying means comprises a molding conveyor defining the mold or molds, i.e. a conveyor belt wherein the molds are formed therein.

The mold conveyor gives a controlled advancing of the mold compared with individually advancing freely movable trays or mold. The precise position of the mold is favorable during dosing of a product into the molds. In addition, cleaning or washing of a molding conveyor belt e.g. continuously, is preferred rather than the cleaning of individual molds or trays. Advantageously, the molding conveyor or the path of the molds is endless.

It is preferred that the molds or molding conveyor and the sheet material or belt are passed synchronously along the cooling means. This prevents not fully frozen material from escaping through the downwards opening in the compartments in the molding conveyor. Furthermore, the risk of tearing of the sheet subjected to friction from the relative movement between the mold and the sheet will be reduced.

In order to ensure a material does not exit from the downwards openings in the compartments, the downwards openings are positioned in close contact with the sheet or belt. In the embodiment of the invention comprising a sheet support for the compartments, for further sealing of the bottom of the compartment when dosing viscous material into the compartment, the molding conveyor and the sheet is conveniently positioned upon the refrigerating panel. However, at subsequent fillings of additional layers of product this may take place while the sheet and molding conveyor pass over panels which are or are not refrigerated, and the tight contact is not as crucial.

The apparatus is provided with bending means to bend the molds whether being separate molds attached to conveyor means or in the form of a molding conveyor. An adequate release of the blocks in the compartments in the molds may be obtained by bending the molds e.g. by letting the molds pass at least partly around a roller. However, it is preferred that the molds are also twisted. The bending and twisting means may e.g. be in the form of a mechanical obstruction in the molds path which forces part of the mold to be lifted above the obstructions. Alternatively, pistons subjecting the mold to alternating pressures may be employed. It follows that the bending means and the twisting means may be constituted by one and the same means or by separate means.

For the release and ejection of at least partly frozen blocks in the compartments, the bending means provides bending and/or the twisting means provides twisting of the mold where it is out of contact with the cooling means. In addition the bending means may provide a bending and/or the twisting means provides a twisting of the molds during its passage along or while being exposed to the cooling means.

What forms of blocks can be frozen in the molding conveyor and how easy it is to release the blocks from the molding conveyor belt depends on the flexibility of the molding conveyor and the compartments formed therein. The molding conveyor belt is preferably of flexible and/or elastic material such as plastic e.g. Polyethylene, PVC or Nylon which can withstand repetitive bending and twisting.

In order to easily release the blocks from the compartments, the side walls of the compartments are preferably e.g. leaning between the upwards and downwards openings. If the block e.g. is to be ejected from the downwards side of the conveyor the downwards opening is preferably larger than the upwards opening.

The apparatus according to the invention may be provided with emptying means for ejecting the blocks from the compartments. This may e.g. be a roller with projections corresponding to the compartments in the mold. If the mold is then trained around the roller the projections will be pressed into the compartments and thus further ease the release of the blocks therefrom. In a special embodiment of the invention the bending means is replaced by means pressing or tapping the blocks out of the compartments. Such means may e.g. be the above described roller with projections.

The material in the compartments is either deep frozen or if in bigger blocks possibly only frozen to have a hard outer covering and subsequently deep frozen outside of the apparatus according to the invention.

Additional cooling means may advantageously be provided e.g. in the form of convection freezing means positioned above or in close relationship with the refrigerating panel. Also liquid nitrogen may be applied for further cooling of the product in the molds. If the blocks in the compartment are only partly frozen before being ejected subsequent further cooling may e.g. be provided with the above mentioned cooling means.

If sheet material is used as a base for the molding conveyor, it is preferably flexible and able to withstand friction from and relative movement of the molding conveyor. In addition the sheet should be a good cold transmitter. In a preferred embodiment of the invention the sheet is a film unrolled from one reel and rolled onto another reel after being passed over the refrigerating panel. If the invention is used for the freezing of food material the sheet or film should be of food acceptable material e.g. PE or PVC which for hygienic reasons do not have to be reused. For such a purpose the sheet or film has a thickness in the range of 10 to 50 microns. Alternatively, the sheet or film could be in an endless band which if desired between each freezing action is cleaned.

In a second aspect, the invention relates to a method for freezing material into blocks comprising the steps of moving the material deposited onto a supporting sheet or belt passing it along cooling means by motion means, the method being characterized in that the material is deposited into at least one upwards and downwards open compartment in a mold and conveyed by conveying means along cooling means on top of the product supporting sheet or belt acting as a base in the compartments along at least part of the passage to freeze the material into blocks, and in that the mold is bent and/or twisted by bending means and/or twisting means to release the block from the compartment.

Conveniently, the method according to the invention also comprises a step of depositing the material into the compartments in the mold.

In a further aspect, the invention relates to blocks frozen in accordance with the above described method wherein the block comprises one or more layers of material. If bigger portions of food material are frozen lumps or whole pieces of meat may be deposited into the compartment and frozen together with viscous foodstuff.

BRIEF DESCRIPTION OF THE DRAWINGS

The apparatus and method according to the invention will now be described in greater detail with reference to the accompanying drawings by way of an example in which.

DETAILED DESCRIPTION OF THE DRAWINGS

Figure 1:
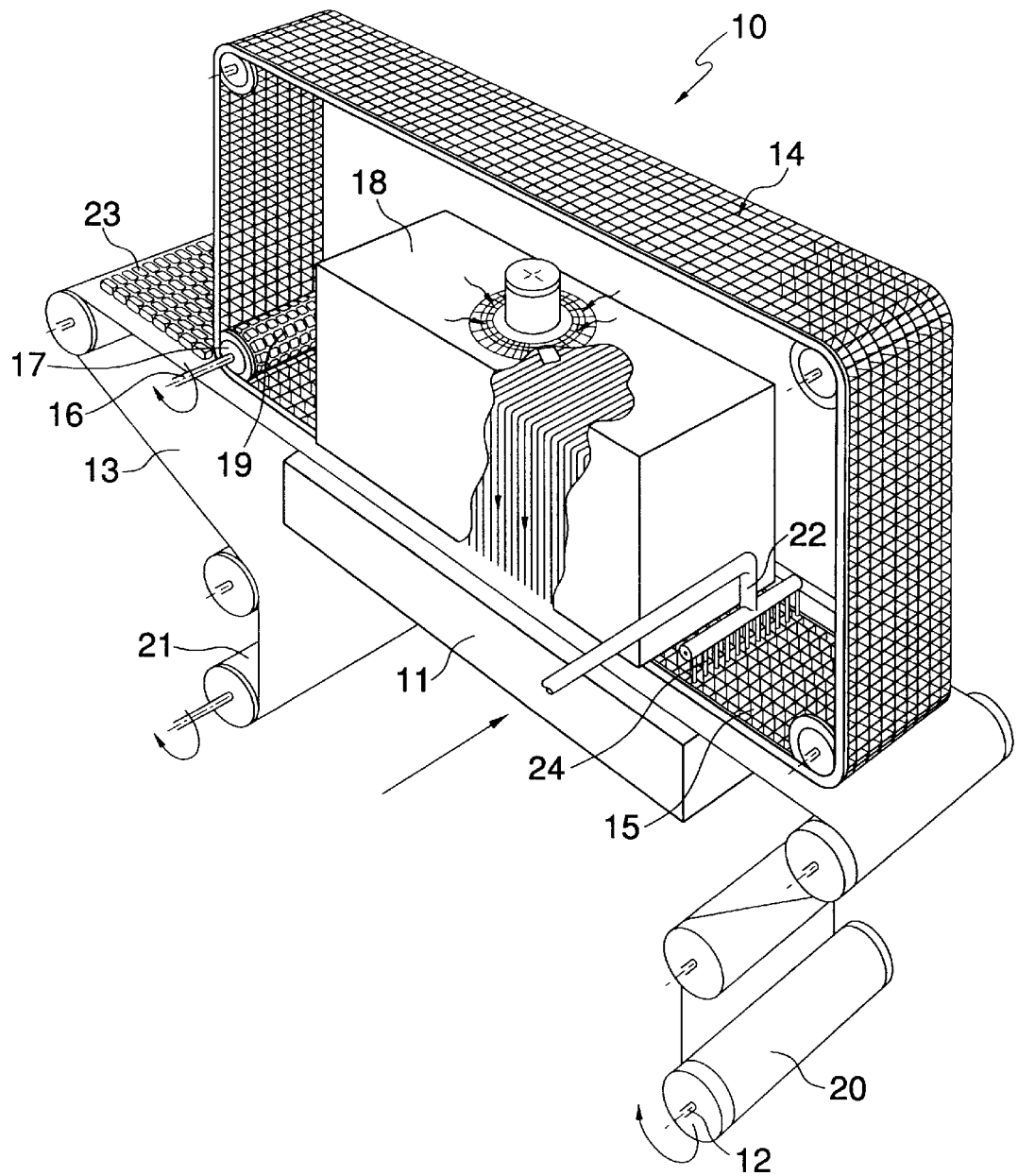
FIG. 1 is a schematic drawing showing an embodiment of the invention wherein a sheet material is used as base in the compartment and the cooling means comprises a contact freezing plate and a convection freezer.

FIG. 1. shows an apparatus comprising cooling means in the form of a contact freezing panel 11, a convection freezer 18 positioned above said panel 11, and motion means 12 to pass a sheet 13 over said panel 11. The sheet in FIG. 1 is a plastic film supplied from a first reel 20 and after its passage over the panel 11 rolled up on second reel 21. The apparatus further comprises a flexible and endless mold conveyor 14 wherein upwards and downwards open compartments 15 are defined. Furthermore, motion means 12 to convey the mold conveyor 14 along the refrigerating panel is provided. The motion means 12 may comprise by any suitable conventional motor for advancing respectively the sheet and the mold conveyor 14.

The endless mold conveyor 14 is guided into close contact with the sheet 13 which at least along the first part of the refrigerating panel 11 acts as a base in the compartment at least until the product in the bottom of the compartments is frozen and hence seals off any escape of the product through the downwards opening in the compartment 15. The product to be frozen is supplied from a reservoir, not shown, and via a distributing channel 22 dosed into the compartments 15 by means of filling nozzles 24. It is preferred that the product is dosed onto the sheet 13 while upon the refrigerating panel 11. Nevertheless, it is possible to dose the product onto the sheet 13 before it reaches the refrigerating panel 11. This does however increase the requirement of close contact between the lower surface of the mold conveyor 14 and the sheet.

The apparatus is further provided with bending means 17 in the form of at least one roller shaft to bend the part of the mold conveyor 14 which is trained around it and thus to release the block in the compartment 15.

The apparatus 10 according to the invention works in the following way: Conveniently, the product to be frozen is dosed into the compartments 15 in the mold conveyor belt 14 while being positioned upon and with the downwards opening in close contact with the sheet 13 which covers the refrigerating panel 11 and prevents the product escaping from the compartment and from sticking to the panel 11. High viscous products can be dosed into the compartment before the molds are passed onto the refrigerating panel 11. The mold and the sheet 13 are passed over the panel 11 and the product is at least partly frozen. The mold is subjected to bending and the pressure of the roller 19 with projections which release blocks 23 of frozen product in the compartments 15. The bending may be carried out while the molds are passed over the refrigerating panel, e.g. by bending the molding conveyor 14 sidewards. In addition or alternatively twisting means may be provided for the release of the blocks 23 from the molds. Accordingly, with the apparatus and method according to the invention and as described above a fast and efficient freezing of material into separated portions or blocks of well defined shape and size is achieved.

I claim:

1. An apparatus for freezing material into blocks comprising: cooling means that includes a refrigeration panel for freezing the material; at least one material receiving mold comprising a sheet or belt that acts as a base and at least one open compartment that has top and bottom openings, the mold being sufficiently resilient to withstand bending or twisting forces; means for conveying the mold past the refrigeration panel for freezing at least a portion of the material in the mold as it moves over the refrigeration panel; and bending means to bend the mold to release the block from the compartment.

2. The apparatus of claim 1, wherein the conveying means comprises a molding conveyor which defines the mold or molds.

3. The apparatus of claim 1, further comprising twisting means to twist the mold or molds to assist in releasing blocks therefrom.

4. The apparatus of claim 1, wherein the conveying means is endless.

5. The apparatus of claim 3, wherein the bending means provides bending and/or the twisting means provides twisting of the mold after the mold has moved past the refrigeration panel.

6. The apparatus of claim 3, wherein the bending means provides a bending and/or the twisting means provides a twisting of the mold conveyor as the mold moves over the refrigeration panel.

7. The apparatus of claim 1, wherein the mold conveyor is made of plastic or rubber.

8. The apparatus of claim 1, further comprising emptying means for ejecting the blocks from the at least one compartment.

9. The apparatus of claim 1, further comprising convection freezing means for further cooling of the material.

10. The apparatus of claim 1, wherein the cooling means utilizes nitrogen and a steel belt acts as the base of the compartments.

11. A method for freezing material into blocks comprising the steps of: depositing the material into at least one open compartment of a mold having top and bottom openings, the mold positioned upon a supporting sheet or belt which acts as a base of the compartment(s); conveying the material and mold along the refrigerator panel while the sheet or belt is moved over the refrigeration panel to freeze the material into blocks, and bending the mold to release the block(s) from the compartment(s).

12. A method for freezing a material into blocks comprising the steps of: depositing the material into a plurality of compartments, wherein the compartments comprise a first endless belt which defines a base of the compartments and a second endless belt which defines sides of the compartments; moving the first and second endless belts along a path while freezing the material inside the compartments into blocks; and releasing the blocks from the compartments by separating the first and second endless belts.

13. The method of claim 12 which further comprises providing cooling from beneath a portion of the first endless belt to freeze the material into the blocks.

14. The method of claim 12 wherein the first and second endless belts are separated by passing over rollers to move away from each other.

15. The method of claim 12 wherein the first and second endless belts are operated synchronously.

16. The apparatus of claim 1 wherein the conveying means comprises a first endless belt and the bending means comprises a first roller over which the first endless belt passes to change direction and thus release the block.

17. The apparatus of claim 16 wherein the at least one mold comprises a second endless belt which includes a plurality of compartment sidewalls, wherein the first and second endless belts more synchronously to simultaneously convey the compartments past the refrigeration panel, and wherein the bending means comprises a second roller over which the second endless belt passes to change direction to assist in releasing the block.

18. An apparatus for freezing a material into blocks comprising: cooling means; a sheet or belt; moving means to pass the sheet or belt along the cooling means; at least one flexible, material receiving mold comprising at least one upwards and downwards open compartment; conveying means to convey the mold along the cooling means on top of the sheet or belt that acts as a base for the open compartment(s) while they contain the material; and bending means to bend the molds to release the frozen blocks formed in the compartment(s).

\* \* \* \* \*